US009477676B2

United States Patent
Okuyama

(10) Patent No.: US 9,477,676 B2
(45) Date of Patent: Oct. 25, 2016

(54) DATA COMPRESSION APPARATUS, DATA COMPRESSION METHOD, AND NON-TRANSITORY COMPUTER READABLE MEDIUM

(71) Applicant: FUJI XEROX CO., LTD., Tokyo (JP)

(72) Inventor: Junichi Okuyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 223 days.

(21) Appl. No.: 14/283,639

(22) Filed: May 21, 2014

(65) Prior Publication Data

US 2015/0120683 A1    Apr. 30, 2015

(30) Foreign Application Priority Data

Oct. 29, 2013    (JP) ................................. 2013-224531

(51) Int. Cl.
 *G06F 17/30*    (2006.01)
(52) U.S. Cl.
 CPC .............................. *G06F 17/30153* (2013.01)
(58) Field of Classification Search
 CPC ................................................ G06F 17/30153
 USPC ....................................................... 707/693
 See application file for complete search history.

(56) References Cited

U.S. PATENT DOCUMENTS

| 8,504,710 B2* | 8/2013 | Fallon | H04N 9/8042 |
| | | | 709/231 |
| 2003/0231799 A1* | 12/2003 | Schmidt | G10L 19/0017 |
| | | | 382/244 |
| 2014/0068313 A1* | 3/2014 | Shimpuku | G06F 1/305 |
| | | | 713/340 |

FOREIGN PATENT DOCUMENTS

JP    A-2010-016547    1/2010

* cited by examiner

*Primary Examiner* — Joshua Bullock
(74) *Attorney, Agent, or Firm* — Oliff PLC

(57) ABSTRACT

A data compression apparatus includes a lossless compression unit performing lossless compression of each data unit of original data to be compressed to output compressed data; a measuring unit measuring a data amount of the compressed data; and a generating unit generating and outputting compression result management data indicating a result of the compression of each data unit of the original data. The generating unit records data indicating a range of the original data of the data unit if the data amount of the compressed data is larger than or equal to the data amount of the data unit before completion of the lossless compression. The generating unit records data indicating a range of the compressed data of the data unit if the data amount of the compressed data is smaller than the data amount of the data unit upon completion of the lossless compression of the data unit.

4 Claims, 5 Drawing Sheets

FIG. 2

| DATA UNIT (NUMBER) | 1 | 2 | 3 | .... |
|---|---|---|---|---|
| OUTPUT DATA TYPE FLAG (COMPRESSION/ ORIGINAL) | COMPRESSION | ORIGINAL DATA | COMPRESSION | .... |
| INITIAL ADDRESS OF OUTPUT DATA | 0x0 | 0x5000 | 0xC00 | .... |
| OUTPUT DATA AMOUNT | 0xAAA | 0xf00 | 0xCC | .... |

DATA COMPRESSION APPARATUS, DATA COMPRESSION METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-224531 filed Oct. 29, 2013.

BACKGROUND (i) Technical Field

The present invention relates to a data compression apparatus, a data compression method, and a non-transitory computer readable medium.

(ii) Related Art

In general, data lossless compression algorithms find deviation or regularity (that is, redundancy) of data and exclude redundant portions to reduce the amount of data. Accordingly, processing of non-redundant data or the like with the algorithms may make the data resulting from the processing larger than the original data not to achieve the effect of the "compression." Accordingly, control has heretofore been performed, in which data subjected to the lossless compression is output for portions in the original data the data amounts of which are reduced by the lossless compression while unprocessed data (that is, the original data itself) is output for portions in the original data the data amounts of which are not reduced by the lossless compression.

SUMMARY

According to an aspect of the invention, there is provided a data compression apparatus including a lossless compression unit, a measuring unit, and a generating unit. The lossless compression unit performs lossless compression of pieces of data of each data unit of original data to be compressed stored in a first memory area in a predetermined order and supplies compressed data sequentially generated by the lossless compression to a second memory area. The measuring unit measures a data amount of the compressed data, which is output as the lossless compression unit performs the lossless compression of the pieces of data of each data unit in the predetermined order, with respect to the data unit. The generating unit generates and outputs compression result management data indicating a result of the compression of each data unit of the original data. The generating unit incorporates data indicating a range in which the original data of the data unit is stored in the first memory area in the compression result management data as the result of the compression of the data unit if the data amount of the compressed data measured by the measuring unit is larger than or equal to the data amount of the data unit before the lossless compression unit completes the lossless compression of the data unit. The generating unit incorporates data indicating a range in which the compressed data corresponding to the data unit is stored in the second memory area in the compression result management data as the result of the compression of the data unit if the data amount of the compressed data measured by the measuring unit is smaller than the data amount of the data unit even when the lossless compression unit completes the lossless compression of the data unit.

BRIEF DESCRIPTION OF THE DRAWINGS

Exemplary embodiments of the present invention will be described in detail based on the following figures, wherein:

FIG. 2 illustrates an exemplary data structure of a management table;

DETAILED DESCRIPTION

Figure 1:
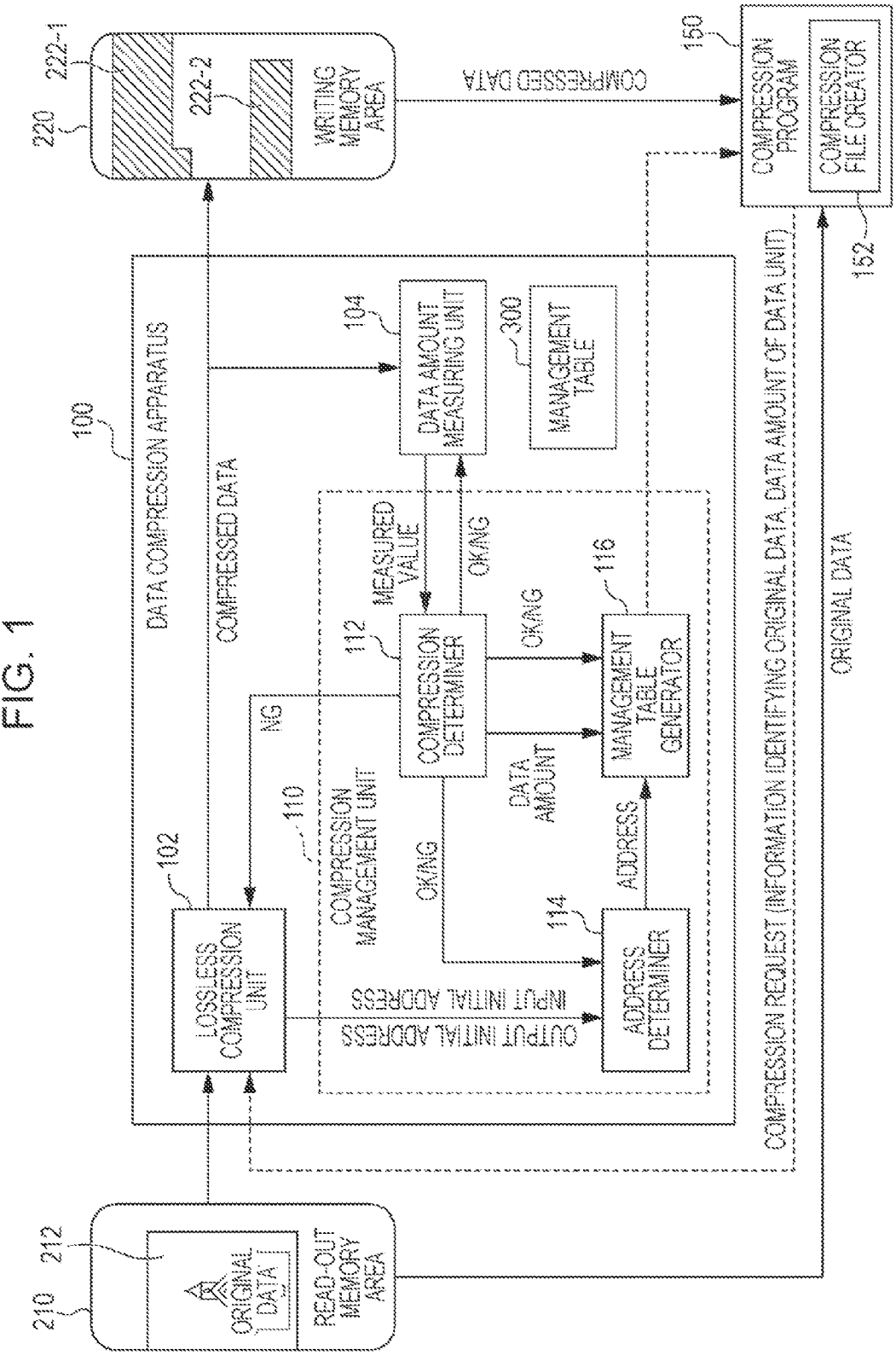
FIG. 1 illustrates an exemplary configuration of a data compression apparatus according to an exemplary embodiment of the present invention.

FIG. 1 illustrates an exemplary configuration of a data compression apparatus 100 according to an exemplary embodiment of the present invention. The data compression apparatus 100 illustrated in FIG. 1 performs lossless compression of bitmap image data. The lossless compression is a data compression method in which original data before the compression is completely equal to data resulting from decompression of the result of the compression of the original data.

In one example, the data compression apparatus 100 is installed as a hardware acceleration circuit for compression of image data, which is connected to a computer incorporated in a digital multifunction machine (a multifunctional apparatus having a copier function, a printer function, a facsimile function, and so on). The specific installation mode of this circuit is not specifically limited. The data compression apparatus 100 may be installed as an integrated circuit having fixed circuitry, such as a large scale integration (LSI) or an application specific integrated circuit (ASIC), or may be installed as one configuration configured on a circuit that is capable of re-configuring the internal circuit configuration, such as a field programmable gate array (FPGA) or a dynamically reconfigurable processor (DRP). In the digital multifunction machine, for example, it may be necessary to perform printing in an order of pages different from the order of pages of an original paper document or print data, as in bookbinding, or it may be necessary to store a bitmap image resulting from scanning or processing of the print data in order to support reprinting of the same document. For example, in the storage of the bitmap image, the bitmap image is subjected to the lossless compression using the data compression apparatus 100 to reduce the capacity of a memory in the digital multifunction machine. In this example, the data compression apparatus 100 receives a compression request in which data to be compressed is specified from a compression program executed by the computer in the digital multifunction machine, performs the compression process in response to the request, and returns the result of the compression (a management table 300 described below) to the program.

A case in which the data compression apparatus 100 is connected to the computer in the digital multifunction machine in the above manner is exemplified in the following description.

The configuration of the data compression apparatus 100 as the hardware acceleration circuit for compression of bitmap image data, which is connected to the computer in the digital multifunction machine, is only an example. The data compression apparatus 100 may be mounted in a computer of another kind, such as a personal computer, or may be configured as software, instead of the hardware circuit, executed in the computer. The data to be compressed is not limited to the bitmap image data and may be any data, such as audio data, movie data, or multimedia data.

Referring to FIG. 1, the data compression apparatus 100 includes a lossless compression unit 102, a data amount measuring unit 104, and a compression management unit 110.

The lossless compression unit 102 performs the lossless compression of original data 212 to be compressed. The method of the lossless compression performed by the lossless compression unit 102 is not specifically limited.

In the compression performed by the lossless compression unit 102, the data is divided into data units each having a predetermined data amount. When the original data 212 is bitmap image data, one line (scanning line) of a rectangular image is an example of the data unit. For example, in the case of a vertically-long A4-sized image of a resolution of 600 dots per inch (dpi), the number of pixels of one line is 4,961. When this image is a grayscale image the density of which is represented by eight bits per pixel, the data amount of one line is 4,961 bytes. The data unit of one line is only an example. Instead of the data unit of one line, for example, a "band" resulting from division of the image in a direction orthogonal to the scanning line at regular intervals or a "tile" resulting from horizontal and vertical division of the image at regular intervals may be used as the data unit. A fixed data amount (for example, 4 bytes or 32 bytes) resulting from division of the image from the beginning, which is irrelevant to the width and the length of the image, may be used as the data unit. A case in which one line of an image is used as the data unit is exemplified in the following description.

The lossless compression unit 102 performs compression and encoding to the pieces of data in each data unit of the original data 212 in a predetermined order. The "predetermined order" is defined by the compression encoding method performed by the lossless compression unit 102. For example, an order in which the compression and encoding is sequentially performed from the first data to the last data in the data unit is an example. A case in which the lossless compression unit 102 compresses the pieces of data in the data unit "sequentially from the beginning" is exemplified in the following description. However, the method of the present exemplary embodiment described below is applicable to a case in which the compression and encoding is performed in another order, for example, a case in which the compression and encoding is performed sequentially from the end to the beginning of the data unit and similar advantages are achieved also in this case.

In this example, the lossless compression unit 102 performs the compression and encoding sequentially from the beginning of the data unit, once completes the compression and encoding at the end of the data unit, and performs the compression and encoding from the beginning of the next data unit. The compression and encoding performed by the lossless compression unit 102 is completed in the data unit in the above manner. The lossless compression unit 102 does not convert a data sequence across two adjacent data units into one compression code.

The lossless compression unit 102 receives the compression request including information identifying the original data 212 and information about the data amount of the data unit from a compression program 150 executed by the computer in the digital multifunction machine. The unit of the data amount may be the byte unit, the bit unit, or another unit. The information identifying the original data 212 indicates a range in which the original data 212 exists in a read-out memory area 210, which is part of a memory (primary memory) space of the computer. For example, a set of the initial address and the data amount of the original data 212 in the read-out memory area 210 may be used as the information identifying the original data 212. The set of the initial address and the data amount of the original data 212 in the read-out memory area 210 is only an example and any information may be used as the information identifying the original data 212 as long as the information is used to identify the range in which the original data 212 exists. The lossless compression unit 102 uses this information to determine the range in the read-out memory area 210 in which the data is compressed. The original data 212 is, for example, a bitmap image of one page.

Upon reception of the compression request from the compression program 150, the lossless compression unit 102 reads out the original data 212 in the read-out memory area 210, for example, sequentially from the beginning in data units to perform the compression and encoding. The lossless compression unit 102 determines the initial address into which the compressed data of each data unit is written in a writing memory area 220 set in the memory space of the computer to sequentially write out the compressed data, which results from the sequential compression of the data unit from the beginning, from the initial address. The method of determining the initial address into which the compressed data corresponding to the data unit is written is not specifically limited. For example, the address next to the final address of the compressed data of a certain data unit may be determined to be the initial address of the next data unit or the initial address may be selected from the writing memory area 220 at random. In the example in FIG. 1, compressed data 222-1 and compressed data 222-2 of two lines of the image are written into separate addresses in the writing memory area 220.

The sequential processing from the first data unit in the original data 212 is only an example. Which order the lossless compression unit 102 processes each data unit in the original data 212 in is defined by the compression and encoding method adopted by the lossless compression unit 102. Although the case in which the data units are sequentially processed from the first data unit in the original data 212 is exemplified in the following description, the method of the present exemplary embodiment is applicable to cases in which the data units are processed in other orders because the method of the present exemplary embodiment does not depend on the processing order of the data units.

In one example, the lossless compression unit 102 supplies information (in the writing memory area 220) about the initial address into which the compressed data of one data unit is written to an address determiner 114 in the compression management unit 110 at certain timing in the compression of the data unit (for example, at the start of the compression, at the end of the compression, or during the entire period from the start of the compression to the end of the compression). The lossless compression unit 102 may supply the initial address of the data unit in the read-out memory area 210 to the address determiner 114. Since both the initial address of one data unit and the initial address into which the compressed data corresponding to the data unit is written are known information for the lossless compression unit 102 at the start of the compression of the data unit by the lossless compression unit 102, it is sufficient for the lossless compression unit 102 to supply the known information to the address determiner 114.

The data amount measuring unit 104 measures the data amount of the compressed data which the lossless compression unit 102 outputs (that is, which is written into the writing memory area 220). The measurement is performed in data units. The measured value of the data amount held by the data amount measuring unit 104 is reset to zero at the beginning of each data unit. Each time the lossless compression unit 102 sequentially compresses the data from the beginning of the data unit to output the code of the result of the compression, the data amount measuring unit 104 measures the data amount of the code to add the measured data amount to the measured value. Accordingly, the measured value held by the data amount measuring unit 104 represents a cumulative total value of the data amount of the compression code output from the lossless compression unit 102 from the time when the beginning of the data unit is output to the current time. The data amount measuring unit 104 supplies the measured value to a compression determiner 112 in the compression management unit 110.

The compression management unit 110 manages the progress of the compression process in the data compression apparatus 100 and creates the result of the compression, that is, the management table 300, which is to be supplied to the compression program 150 as a response to the compression request. In order to carry out this function, the compression management unit 110 includes the compression determiner 112, the address determiner 114, and a management table generator 116.

The compression determiner 112 determines whether the lossless compression unit 102 succeeds or fails in the data compression of each data unit. The success in the data compression means that the data amount resulting from the lossless compression is made smaller than the data amount of the original data. The failure in the data compression means that the data amount resulting from the lossless compression is made larger than or equal to the data amount of the original data. In other words, the compression determiner 112 determines whether the object of the "compression", which is the reduction in the data amount, is achieved for every data unit. The compression determiner 112 compares the cumulative data amount (the measured value) of the compressed data of each data unit at the current time when the data is supplied from the data amount measuring unit 104 with the data amount of the data unit to perform the above determination. The data amount of the data unit (for example, one line of image data) is included in the compression request from the compression program 150 as one parameter, as described above. The measured value output from the data amount measuring unit 104 is sequentially increased as the lossless compression unit 102 sequentially advances the compression and encoding from the beginning of the data unit. Upon detection of the measured value that is higher than or equal to the data amount of the data unit, the compression determiner 112 determines that the compression fails (that is, the object of the "compression" is not achieved) to output an NG signal indicating that the compression fails. In contrast, if the measured value is lower than the data amount of the data unit when the lossless compression unit 102 completes the output of the code of the final result of the compression of the data unit (that is, when the data amount measuring unit 104 completes the addition of the data amount of the code of the final result of the compression to the measured value), the data amount is reduced by the lossless compression. In this case, the compression determiner 112 outputs an OK signal indicating that the compression succeeds. In the output of the OK signal, the compression determiner 112 supplies the measured value supplied from the data amount measuring unit 104 at that time (this value indicates the total amount of data of the compressed data corresponding to the data unit) to the management table generator 116.

The timing when the lossless compression unit 102 completes the output of the code of the final result of the compression of the data unit is identified by monitoring of an elapsed time from the beginning of the data unit. In other words, since the data amount of the data unit that is being compressed is known, a value resulting from division of the data amount by a certain read-out speed indicates the time required to compress the data unit (this time is called a compression required time) when the lossless compression unit 102 reads out the data of the data unit to be compressed from the read-out memory area 210 at the certain read-out speed (for example, one byte per one clock). The compression determiner 112 may count the elapsed time (for example, the number of clocks) from the start of the compression of the data unit to recognize the timing when the measured value reaches the compression required time as timing when the compression of the data unit is completed, that is, timing when the code of the final result of the compression of the data unit is output. This is an example when the code of the final result of the compression of the data unit is output from the lossless compression unit 102 immediately upon input of the final data portion of the data unit into the lossless compression unit 102 (for example, the final one byte of the data unit at the input speed of one byte per one clock). When it takes a certain time from the input of the final data portion of the data unit into the lossless compression unit 102 to the output of the code of the final result of the compression corresponding to the data unit, the time when the elapsed time from the start of the compression is equal to a value resulting from addition of the certain time to the compression required time may be recognized as the timing when the code of the final result of the compression of the data unit is output.

The NG signal output from the compression determiner 112 is supplied to the lossless compression unit 102, the data amount measuring unit 104, the address determiner 114, and the management table generator 116. The OK signal output from the compression determiner 112 is supplied to the data amount measuring unit 104, the address determiner 114, and the management table generator 116. Instead of the explicit supply of the OK signal to each unit, each unit may count the elapsed time of the compression process from the beginning of each data unit and, if no NG signal is received even when the result of the measurement of the elapsed time reaches the time required to compress one data unit (which is a fixed value and a known value), each unit may perform the processing when the compression succeeds.

Upon reception of the NG signal, the lossless compression unit 102 stops the compression of the data unit which the lossless compression unit 102 performs. In this case, the result of the compression of the data unit in the writing memory area 220 is discarded and any data to be compressed, which is not compressed and which exists in the lossless compression unit 102, is also discarded. The lossless compression unit 102 starts the compression process of the next data unit. If no NG signal is supplied from the compression determiner 112 even when the compression is completed to the end of the data unit, this means that the compression of the data unit succeeds. In this case, the lossless compression unit 102 automatically starts the read-out and the compression of the next data unit. Accordingly, it is not necessary for the compression determiner 112 to explicitly supply the OK signal to the lossless compression unit 102.

Upon reception of the OK signal or the NG signal from the compression determiner 112, the data amount measuring unit 104 resets the measured value that is held to zero. This allows the data amount of the compressed data of the next data unit to be measured up again from zero.

In one example, the address determiner 114 receives the initial address (an input initial address) of the data unit to be currently compressed in the read-out memory area 210 and the initial address (an output initial address) into which the compressed data corresponding to the data unit is written in the writing memory area 220 from the lossless compression unit 102. The address determiner 114 selects the output initial address (the initial address of the compressed data) to supply the output initial address to the management table generator 116 if a determination signal of the result of the compression supplied from the compression determiner 112 is the OK signal and selects the input initial address (the initial address of the original data unit) to supply the input initial address to the management table generator 116 if the determination signal of the result of the compression supplied from the compression determiner 112 is the NG signal.

The management table generator 116 generates the management table 300 indicating the result of the compression of the original data 212.

FIG. 2 illustrates an exemplary data structure of the management table 300. As illustrated in FIG. 2, identification information about each data unit (for example, the number of the data unit measured from the beginning), an output data type flag, an initial address of output data, and an output data amount are recorded for each data unit sequentially from the beginning of the original data 212 in the management table 300.

The "output data type flag" indicates which data, among the compressed data and the original data, the data compression apparatus 100 adopts as output data of the data unit. In the present exemplary embodiment, the compressed data is output if the data amount is reduced by the lossless compression and the original data is output, instead of the compressed data, if the data amount is not reduced by the lossless compression to ensure that a compression ratio of the entire original data 212 is not higher than or equal to one (that is, the data amount of the compressed data is not larger than or equal to the data amount of the original data 212). Accordingly, the data indicating the result of the compression of the data unit by the lossless compression unit 102 is adopted as the output if the data amount of the result of the compression is smaller than the data amount of the data unit and, otherwise, the data unit itself in the writing memory area 220 is adopted as the output.

The "initial address of output data" is the initial address of the data adopted by the data compression apparatus 100 as the output data of the data unit. The initial address of the compressed data corresponding to the data unit in the writing memory area 220 is recorded as the value of the "initial address of output data" if the compressed data is adopted as the output data corresponding to the data unit, and the initial address of the data unit in the read-out memory area 210 is recorded as the value of the "initial address of output data" if the original data is adopted as the output data corresponding to the data unit.

The "output data amount" is the data amount of the data adopted by the data compression apparatus 100 as the output data of the data unit. If the compressed data is adopted as the output data corresponding to the data unit, the total amount of data of the compressed data corresponding to the data unit measured by the data amount measuring unit 104 is recorded as the "output data amount." If the original data is adopted as the output data corresponding to the data unit, the data amount of the data unit itself, which is a fixed value, (the value included in the compression request from the compression program 150) is recorded as the "output data amount." When the output data type flag is the "original data", the output data amount constantly has the same value ("0xf00" in the example in FIG. 2).

As described above, the set of the "initial address of output data" and the "output data amount" in the management table 300 indicates which range the result of the compression of the data unit (the compressed data or the original data) is stored in on the memory. The information about the range may be represented by a representation form other than the set of the "initial address of output data" and the "output data amount."

Figure 3:
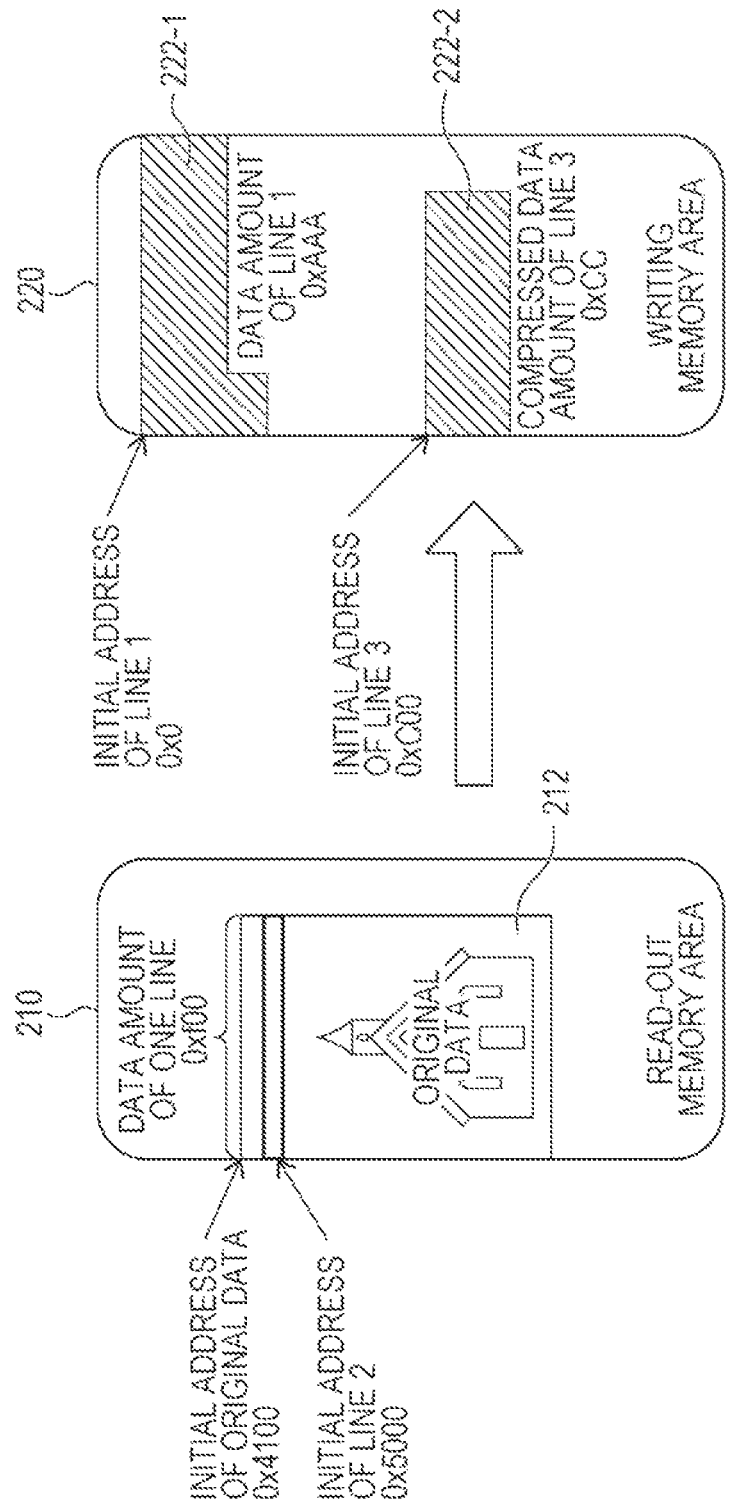
FIG. 3 is a diagram for describing the content of the management table illustrated in FIG. 2.

The management table 300 (part of the management table 300) illustrated in FIG. 2 represents a status illustrated in FIG. 3. In an example in FIG. 3, the initial address of the original data 212, which is image data, is "0x4100" and the data amount of one line is "0xf00" bytes. In this example, the data unit of the lossless compression is one line. In this example, as for the first data unit (line number 1), the compressed data 222-1 is adopted as the output, the initial address of the compressed data 222-1 is "0x0" in the writing memory area 220, and the compressed data amount is "0xAAA." As for the second data unit (line number 2), the line 2 itself in the original data 212 is adopted, the initial address of the line 2 is "0x5000" in the read-out memory area 210, and the compressed data amount is "0xf00." As for the third data unit (line number 3), the compressed data 222-2 is adopted as the output, the initial address of the compressed data 222-2 is "0xC00" in the writing memory area 220, and the compressed data amount is "0xCC."

If the OK signal is supplied from the compression determiner 112 for a certain data unit, the management table generator 116 sets the output data type flag of the data unit to the "compressed data" and records the value of the data amount of the compressed data supplied from the compression determiner 112 as the output data amount. The management table generator 116 records the initial address of the compressed data supplied from the address determiner 114 as the initial address of the output data.

If the NG signal is supplied from the compression determiner 112 for a certain data unit, the management table generator 116 sets the output data type flag of the data unit to the "original data" and records the data amount of the data unit, which is a fixed value, as the output data amount. The management table generator 116 records the initial address of the data unit supplied from the address determiner 114 as the initial address of the output data.

Upon completion of the recording of management information (the set of the flag, the initial address, and the data amount) to the final data unit of the original data 212 in the management table 300, the management table generator 116 returns the management table 300 that is completed to the compression program 150 as the result of the compression in response to the compression request.

Upon reception of a request to compress the original data 212 from a user, another program, etc., the compression program 150 submits the compression request including the information identifying the original data 212 and the data amount of the data unit in the compression to the data compression apparatus 100. Specification of the data unit for the compression program 150 by the user or setting of the default data unit in the compression program 150 allows the compression program 150 to calculate the data amount of the specified data unit or the default data unit to include the calculated data amount in the compression request. For example, when the data unit is specified or set as one line of image data, which is the original data 212, the compression program 150 calculates the number of pixels per line and the data amount per pixel from information about the size of the image data, which is the original data 212, to obtain the result of multiplication of the number of pixels per line by the data amount per pixel as the data amount of the data unit (one line). When the data unit is specified as one band, the compression program 150 may use the number of lines per band to obtain the data amount of the data unit.

The compression program 150 includes a compression file creator 152. The compression file creator 152 refers to the management table 300 returned from the data compression apparatus 100 as the response to the compression request to create a compression file, which is the result of the compression in response to a compression instruction from the user or another program. The compression file creator 152 extracts the information in each data unit from the management table 300 sequentially from the first data unit. Then, the compression file creator 152 reads out the data of the data amount indicated by the "output data amount" from the address on the memory space indicated by the "initial address of output data" of the data unit to write the data that is read out into the compression file. In addition, the compression file creator 152 writes the flag information indicating whether the data of the data unit is the compressed data or the original data (non-compressed data), which depends on the value of the "output data type flag" of the data unit, into the management information about the data unit in the compression file. The compression file creator 152 may write the value of the "output data amount" into the management information about the data unit in the compression file. It is sufficient for the compression file creator 152 to write the entity data (the compressed data or the original data) of each data unit and the management information about each data unit into the compression file in accordance with the format of the compression file specified by the user or the other program.

Figure 4:
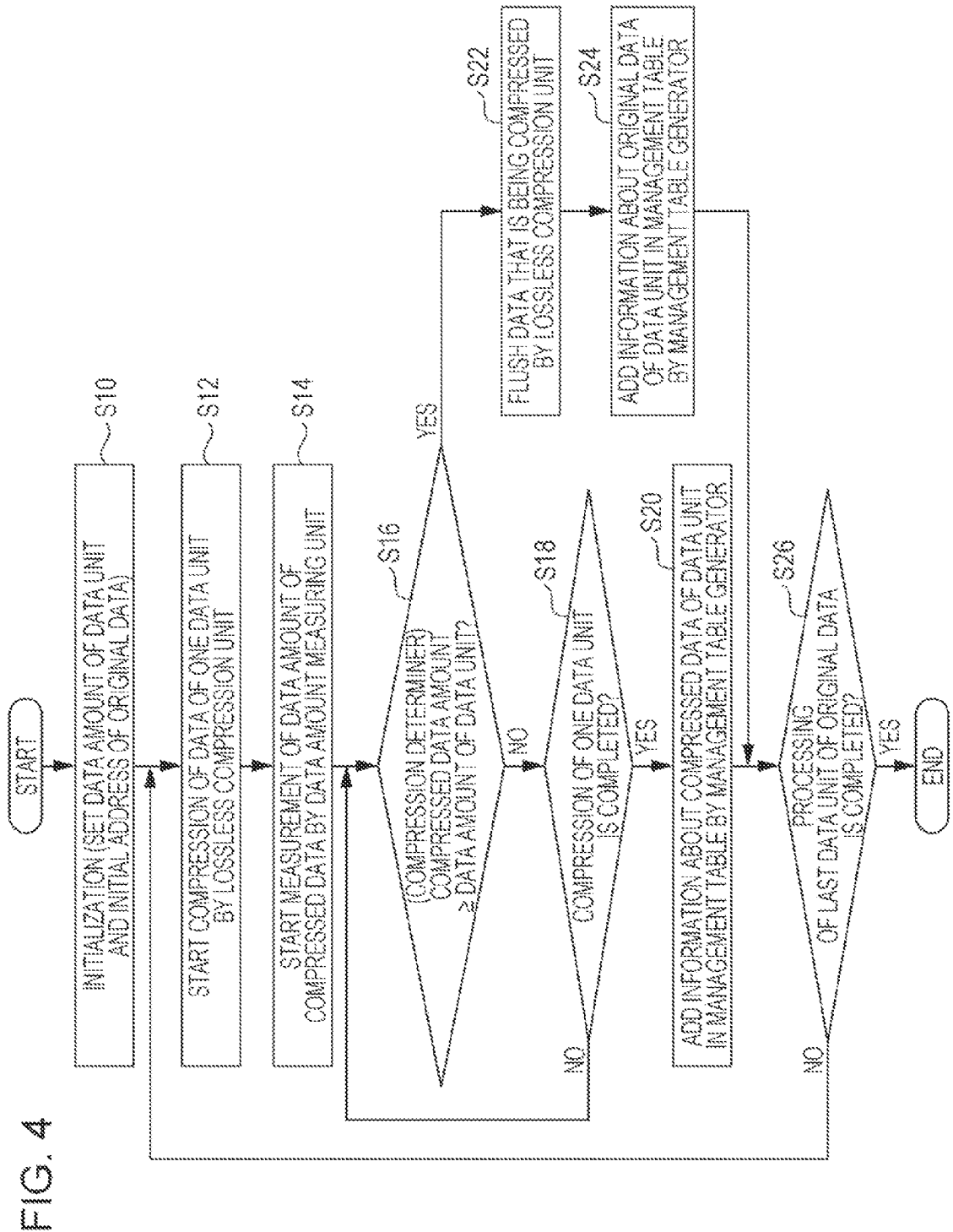
FIG. 4 is a flowchart illustrating an exemplary process performed by the data compression apparatus of the present exemplary embodiment.

FIG. 4 is a flowchart illustrating an exemplary process performed by the data compression apparatus 100 of the present exemplary embodiment. Referring to FIG. 4, upon reception of the compression request from the compression program 150, in Step S10, the data compression apparatus 100 initializes the apparatus. In the initialization, the data compression apparatus 100 sets the initial address and the data amount of the original data 212 included in the compression request and the data amount of the data unit in a memory, such as a register, in the data compression apparatus 100. Each unit, such as the lossless compression unit 102, in the data compression apparatus 100 refers to the value set in the memory, if desired. Alternatively, the value of the initial address or the like of the original data may be set in each unit using the value in the data compression apparatus 100.

Upon completion of the initialization, in Step S12, the lossless compression unit 102 reads out the data from the initial address of the original data 212 (that is, the initial address of the first data unit of the original data 212) to start the compression. In Step S14, the data amount measuring unit 104 starts the measurement of the data amount of the compressed data output from the lossless compression unit 102. The measured value in the data amount measuring unit 104 is increased as the data compression by the lossless compression unit 102 advances. In Step S16, for example, the compression determiner 112 compares the measured value (the total amount of the compressed data at the current time of the data unit) with the data amount of the data unit periodically or each time the measured value supplied from the data amount measuring unit 104 is incremented.

If the comparison indicates that the measured value is lower than the data amount of the data unit (NO in Step S16), in Step S18, the compression determiner 112 determines whether the lossless compression unit 102 completes the compression of all pieces of data in the data unit. If the compression determiner 112 determines that the lossless compression unit 102 does not complete the compression of all pieces of data in the data unit (NO in Step S18), the process goes back to Step S16 to repeat the determination. If the compression determiner 112 determines that the lossless compression unit 102 completes the compression of all pieces of data in the data unit (YES in Step S18), the compression determiner 112 supplies the OK signal to the data amount measuring unit 104, the address determiner 114, and the management table generator 116, and also supplies the measured value (indicating the total amount of the compressed data of the data unit) supplied from the data amount measuring unit 104 to the management table generator 116. The data amount measuring unit 104 resets the measured value to zero in response to the OK signal. In Step S20, the management table generator 116 records the flag indicating the compressed data, the initial address of the compressed data supplied from the address determiner 114, and the data amount of the compressed data supplied from the compression determiner 112 as data items of the data unit in the management table 300.

If the compression determiner 112 determines that the measured value is higher than or equal to the data amount of the data unit (YES in Step S16), the compression determiner 112 supplies the NG signal to the lossless compression unit 102, the data amount measuring unit 104, the address determiner 114, and the management table generator 116. In Step S22, the lossless compression unit 102 flushes the data that is being compressed in response to the NG signal. Specifically, the lossless compression unit 102 opens the area of the compressed data of the data unit that is being written in the writing memory area 220 to discharge the data and the compressed data of the data unit in the lossless compression unit 102. The data amount measuring unit 104 resets the measured value to zero in response to the NG signal. In Step S24, the management table generator 116 records the flag indicating the original data, the initial address of the data unit supplied from the address determiner 114, and the data amount of the data unit, which is a fixed value, as the data items of the data unit in the management table 300.

After Step S20 and Step S24, in Step S26, it is determined whether the processing of the last data unit of the original data is completed. If the processing of the last data unit of the original data is not completed (NO in Step S26), the process goes back to Step S12. In Step S12, the lossless compression unit 102 starts the compression of the data of the next data unit of the original data 212. The above process is repeated in Step S26 until the processing of the last data unit of the original data 212 is completed.

Upon completion of the processing to the end of the original data 212, the generation of the management table 300 indicating the result of the compression of the original data 212 is completed, and the compressed data 222-1, the compressed data 222-2, . . . of the respective data units used in the result of the compression are stored in the writing memory area 220. The original data 212 is held in the read-out memory area 210. Upon reception of the generated management table 300, the compression file creator 152 in the compression program 150 reads out and assemblies the data of each data unit from the read-out memory area 210 and the writing memory area 220 in accordance with the management table 300 to create the compression file corresponding to the original data 212. The management information indicating whether the data of each data unit is the compressed data or the original data is also included in the compression file. A circuit or a program for decompressing the compression file refers to the management information to decompress the compressed data portion in the compression file with a decompression algorithm supporting the lossless compression and output the decompressed data and to directly output the original data portion.

In the compression method of the present exemplary embodiment, the compressed data of each data unit output from the lossless compression unit 102 is immediately written into the writing memory area 220 outside the data compression apparatus 100 without being stored in the data compression apparatus 100. The data amount measuring unit 104 measures the data amount of the compressed data and the compression determiner 112 compares the measured value with the data amount of the data unit of the original data to determine whether the data amount of the compressed data is larger than or equal to the data amount of the original data. The data compression apparatus 100 outputs the management table 300 indicating whether each data unit is the original data or the compressed data as the result of the compression, and the compression program 150 using the data compression apparatus 100 uses the management table 300 to create the compression file from the original data 212 and the compressed data 222-1, the compressed data 222-2, . . . on the memory of the computer which executes the compression program 150. It is not necessary to provide a storage area where the original data and the compressed data in data units are stored in the data compression apparatus 100 because of the adoption of such a mechanism. As described above, in the present exemplary embodiment, the use of the memory of the computer to which the data compression apparatus 100 is connected allows the circuit size of the data compression apparatus 100 (the circuit size for storage) to be reduced.

Figure 5:
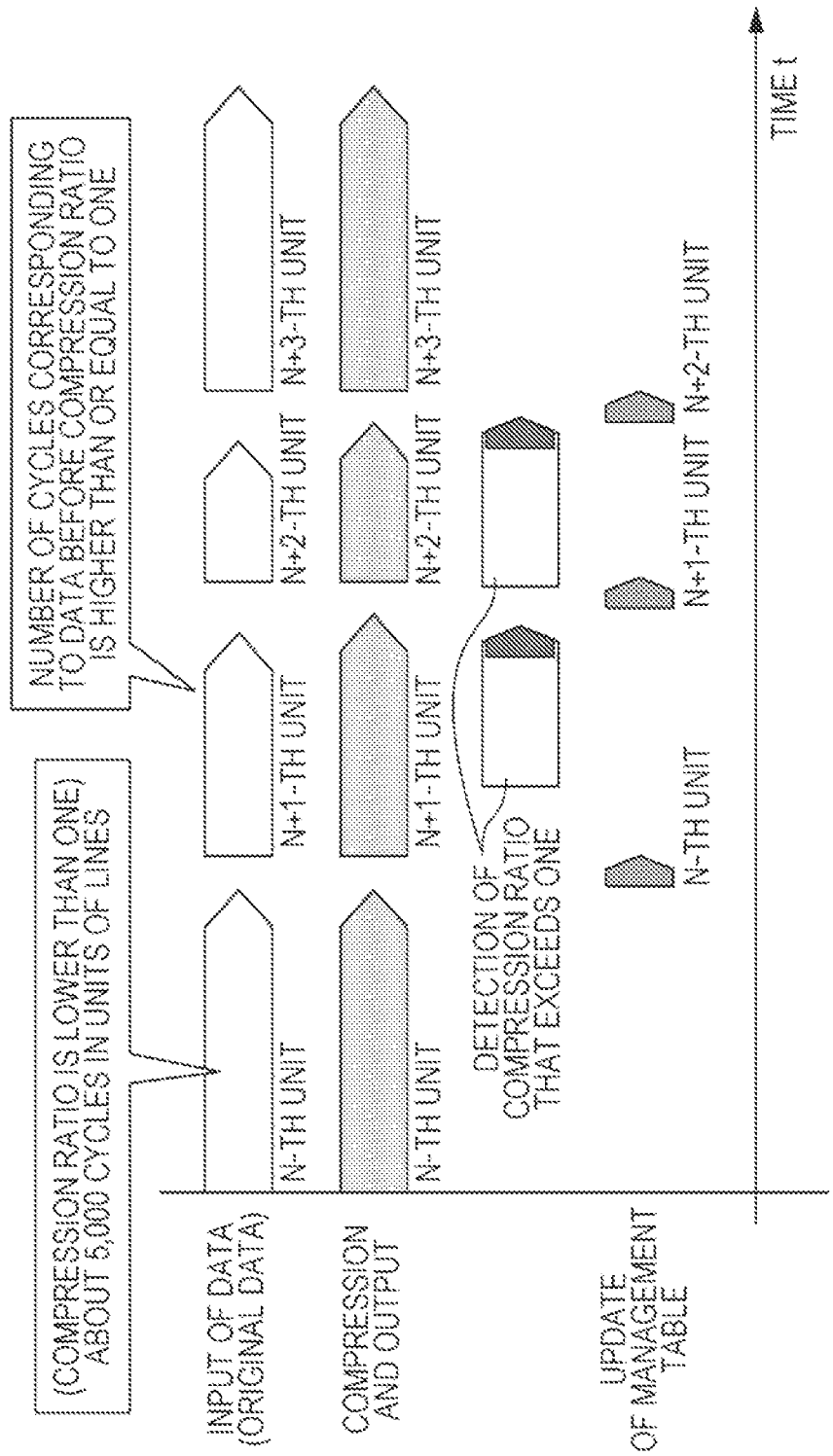
FIG. 5 is an exemplary time chart of a compression process by the data compression apparatus of the present exemplary embodiment.

FIG. 5 is an exemplary time chart of the compression process by the data compression apparatus 100 of the present exemplary embodiment. Timing of input of the original data into the lossless compression unit 102, timing of the compression process in the lossless compression unit 102 and output of the compressed data, timing of detection of the compression ratio that exceeds one (that is, of the data amount of the compressed data that exceeds the data amount of the data unit) in the compression determiner 112, and timing of update of the management table 300 by the management table generator 116 (the writing of the information about the data unit) are sequentially illustrated from the top in FIG. 5. FIG. 5 illustrates an exemplary flow of the processing for the data units from the N-th data unit (N is an integer larger than or equal to one) to the (N+2)-th data unit.

In the example in FIG. 5, as for the N-th unit, the compression ratio by the lossless compression is lower than one (that is, the data amount is reduced by the compression) and, thus, the compression succeeds. In this example, the original data 212 represents a vertically-long A4-sized image of a resolution of 600 dpi and the image is represented by one byte per pixel. Data of one byte is input for every cycle (one clock) of the operation clock of the data compression apparatus 100. The data unit is one line of the image (about 5,000 pixels=the data amount, about 5,000 bytes). Since the N-th data unit is input into the data compression apparatus 100 to the end for compression, it takes a time corresponding to about 5,000 cycles for the compression process. Upon completion of the compression of the N-th data unit, the management information about the data unit (the flag indicates the "compressed data") is added to the management table 300. After the data is added to the management table 300, the compression of the (N+1)-th data unit is started.

As for the (N+1)-th data unit, since the data amount of the compressed data measured by the data amount measuring unit 104 becomes higher than or equal to the data amount of the data unit (the compression ratio is higher than or equal to one also viewed from the entire data unit) before the compression of all the data is completed, the compression process of the data unit is stopped when the compression ratio becomes higher than or equal to one. Accordingly, the time during which the (N+1)-th data unit is being compressed is shorter than about 5,000 cycles, which is the time required to process one line. After the compression process is stopped, the management information about the (N+1)-th data unit (the flag indicates the "original data") is written into the management table 300 and the compression of the next data unit, that is, the (N+2)-th data unit is started.

Also as for the (N+2)-th data unit, the data amount of the compressed data becomes higher than or equal to the data amount of the original data unit during the processing and the compression process is stopped at the time when the data amount of the compressed data becomes higher than or equal to the data amount of the original data unit. Then, the compression of the next (N+3)-th data unit is started.

As described above, in the processing by the data compression apparatus 100 of the present exemplary embodiment, the compression process is stopped for the data unit the compression ratio of which is higher than or equal to one (that is, the data amount of which is not reduced by the lossless compression) before the compression process of all the data of the data unit is completed and the processing goes to the compression process of the next data unit. Accordingly, the time during which the data unit the compression ratio of which is higher than or equal to one is being compressed is shorter than the time to compress the data unit the compression ratio of which is lower than one.

Although the data compression apparatus applied to the compression of the bitmap image in the digital multifunction machine is described above as a typical example, the data compression apparatus of the present exemplary embodiment may be mounted in an apparatus other than the digital multifunction machine and may be used for the compression of data other than the bitmap image, such as movie data, audio data, multimedia data, or document data.

Although the original data unit is adopted as the result of the compression when the data amount of the compressed data of the data unit is equal to the data amount the original data unit in the above examples, the compressed data may be used as the result of the compression.

Although the case in which the data compression apparatus 100 is configured as the hardware circuit is exemplified in the above description, this is only an example. The data compression apparatus 100 may be configured as software. Also when the data compression apparatus 100 is configured as the software, the original data and the compressed data in data units are not stored in the internal processing in the data compression apparatus 100 for, for example, the comparison of the data amount. Accordingly, the amount of memory which the data compression apparatus 100 uses for the processing is smaller than that in an apparatus that stores the original data and the compressed data in data units for, for example, the comparison of the data amount.

When the data compression apparatus 100 is realized as the software, the computer may be caused to execute a program in which the functions of the functional modules 102 to 116 in the data compression apparatus 100 are described. The computer has, for example, a circuit configuration in which a microprocessor, such as a central processing unit (CPU); memories (primary memories), such as a random access memory (RAM) and a read only memory (ROM); a secondary memory controller controlling a secondary memory, such as a hard disk drive (HDD); various input-output (I/O) interfaces; a network interface performing control for connection to a network, such a local area network; and so on are connected to each other via a bus, as the hardware configuration. A disk drive for reading from and/or writing into a portable disk recording medium, such as a compact disc (CD), a digital versatile disk (DVD), or a Blu-ray disc, a memory reader-writer for reading from and/or writing into portable non-volatile recording media conforming to various standards, such as a flash memory, and so on may be connected to the bus, for example, via the I/O interfaces. The program in which the content of processing in the functional modules exemplified above is described is stored in the secondary memory, such as the hard disk drive, via the recording medium, such as the CD or the DVD, or via a communication unit, such as a network, to be installed in the computer. The program stored in the secondary memory is read out into the RAM and is executed by the microprocessor, such as the CPU, to realize the functional modules described above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data compression apparatus comprising:
a lossless compression unit comprising a circuit or processor operatively connectable to a first memory area and a second memory area, the lossless compression unit being configured to:
access original data to be compressed that is stored in the first memory area;
perform lossless compression of pieces of data of each data unit of the original data to be compressed in a predetermined order;
supply compressed data sequentially generated by the lossless compression to the second memory area;
measure a data amount of the compressed data, which is output as the lossless compression is performed;
generate compression result management data indicating a result of the compression of each data unit of the original data by:
incorporating data indicating a range in which the original data of the data unit is stored in the first memory area in the compression result management data as the result of the compression of the data unit if the measured data amount of the compressed data is larger than or equal to the data amount of the data unit before the lossless compression of the data unit is complete;
incorporating data indicating a range in which the compressed data corresponding to the data unit is stored in the second memory area in the compression result management data as the result of the compression of the data unit if the measured data amount of the compressed data is smaller than the data amount of the data unit even when the lossless compression the data unit has been completed; and
output the generated compression result.

2. The data compression apparatus according to claim 1, wherein the lossless compression unit is configured to:
stop the lossless compression of the data unit at a time when the data amount of the compressed data measured by the measuring unit is larger than or equal to the data amount of the data unit before the lossless compression of the data unit is completed; and
start the lossless compression of a next data unit.

3. A non-transitory computer readable medium storing a program causing a computer to execute a process comprising:
performing lossless compression of pieces of data of each data unit of original data to be compressed stored in a first memory area in a predetermined order and supplying compressed data sequentially generated by the lossless compression to a second memory area;
measuring a data amount of the compressed data, which is output as the lossless compression of the pieces of data of each data unit is performed in the predetermined order, with respect to the data unit; and
generating and outputting compression result management data indicating a result of the compression of each data unit of the original data, the generating incorporating data indicating a range in which the original data of the data unit is stored in the first memory area in the compression result management data as the result of the compression of the data unit if the data amount of the compressed data that is measured is larger than or equal to the data amount of the data unit before the lossless compression of the data unit is completed, the generating incorporating data indicating a range in which the compressed data corresponding to the data unit is stored in the second memory area in the compression result management data as the result of the compression of the data unit if the data amount of the compressed data that is measured is smaller than the data amount of the data unit even when the lossless compression of the data unit is completed.

4. A data compression method comprising:
performing lossless compression of pieces of data of each data unit of original data to be compressed stored in a first memory area in a predetermined order and supplying compressed data sequentially generated by the lossless compression to a second memory area;
measuring a data amount of the compressed data, which is output as the lossless compression of the pieces of data of each data unit is performed in the predetermined order, with respect to the data unit; and
generating and outputting compression result management data indicating a result of the compression of each data unit of the original data, the generating incorporating data indicating a range in which the original data of the data unit is stored in the first memory area in the compression result management data as the result of the compression of the data unit if the data amount of the compressed data that is measured is larger than or equal to the data amount of the data unit before the lossless compression of the data unit is completed, the generating incorporating data indicating a range in which the compressed data corresponding to the data unit is stored in the second memory area in the compression result management data as the result of the compression of the data unit if the data amount of the compressed data that is measured is smaller than the data amount of the data unit even when the lossless compression of the data unit is completed.

* * * * *